L. LOGAN.
ELECTRIC MEASURING INSTRUMENT.
APPLICATION FILED MAR. 5, 1913.

1,142,593.

Patented June 8, 1915.

WITNESSES
C. K. Reichenbach.
A. L. Kitchin.

INVENTOR
Lloyd Logan
BY Munn & Co
ATTORNEYS

UNITED STATES PATENT OFFICE.

LLOYD LOGAN, OF BOSTON, MASSACHUSETTS.

ELECTRIC MEASURING INSTRUMENT.

1,142,593.      Specification of Letters Patent.      Patented June 8, 1915.

Application filed March 5, 1913. Serial No. 752,068.

*To all whom it may concern:*

Be it known that I, LLOYD LOGAN, a subject of the King of Great Britain, and a resident of Boston, in the county of Suffolk and State of Massachusetts, have invented a new and Improved Electric Measuring Instrument, of which the following is a full, clear, and exact description.

This invention relates to improvements in measuring devices for electric currents, and has for an object to provide an improved structure in which the principle of the rotation of the plane of polarized light is utilized for measuring various currents of different strength.

Another object of the invention is to provide a measuring device for currents or an ammeter structure in which a solenoid is wound over or around a light polarizer and analyzer so as to cause the rotation of the plane of the polarization of the light when current is passing through the coil for indicating the strength of the current, the rotation being proportionate to the strength of the current.

In carrying out the objects of the invention, a solenoid of any desired kind is supplied, formed of wire of sufficient size for carrying a maximum current to be tested. Arranged in this solenoid is a light polarizer and analyzer with a transparent core positioned therebetween. Associated with the analyzer is a calibrator or scale structure which will read in amperes and which is intended to be rotated manually for measuring the degree of rotation of the plane of polarized light and thus produce the proper reading in amperes.

A practical embodiment of the invention is represented in the accompanying drawings forming a part of this specification, in which similar characters of reference indicate corresponding parts in all the views.

Figure 1:
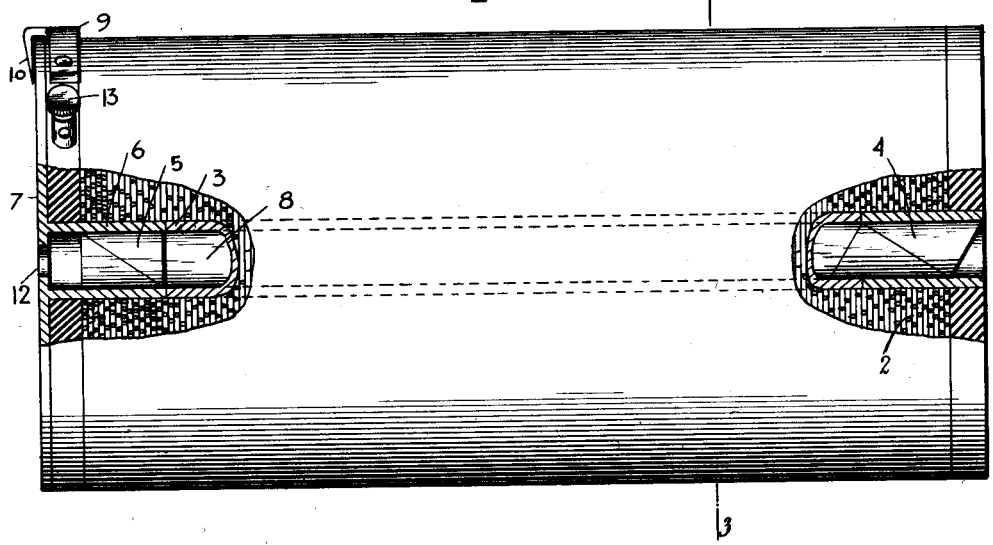
Figure 2:
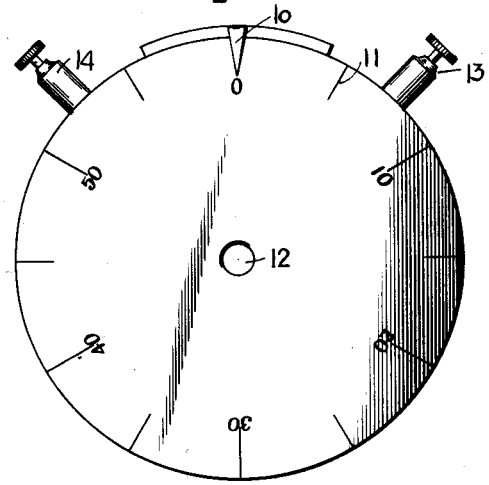
Figure 3:
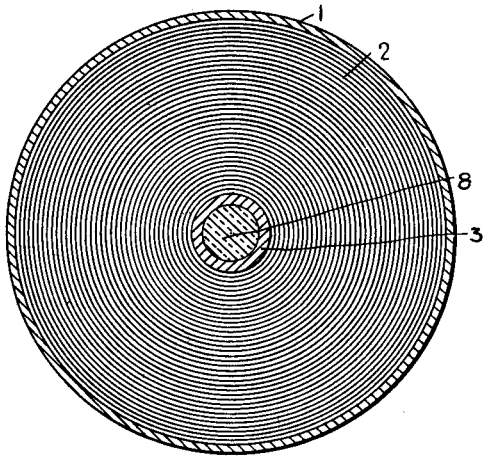

Figure 1 is a side view of an embodiment of the invention, certain parts being broken away for better illustrating the construction; Fig. 2 is an end view of the structure shown in Fig. 1; and Fig. 3 is a section through Fig. 1 on the line 3—3.

Referring to the accompanying drawings by numerals, 1 indicates a casing of any desired kind, and 2 a solenoid surrounding a metallic tube 3 in which is arranged a polarizing prism 4, which may be of any desired type, as for instance the Nicol prism. At the opposite end of tube 3 is arranged an analyzer or analyzing prism 5. The analyzer 5 is mounted in a tubular extension 6 rigidly secured to a face plate or dial plate 7. The extension 6 is preferably formed from soft iron and is in alinement with the tube 3 in order to allow the magnetic effect created by current passing through coil 2 to properly act. Arranged in tube 3 between the prism 4 and analyzer 5 is a transparent member 8 formed of any desired material, as for instance glass. In arranging the members 4 and 5, the same are preferably arranged so as to be wholly within the coil in order that the full force of the magnetic influence may act thereon so as to properly rotate the plane of the polarized light.

Connected with the casing 1 in any desired manner is a plate 9 provided with a pointer 10 designed to coöperate with the dial 11 marked off on the face plate 7. From Figs. 1 and 2 it will be observed that the face plate 7 is provided with an eyepiece or opening 12 so as to view member 5 in order to ascertain the position of the ray of light. Suitable binding posts 13 and 14 are connected with casing 1 in any desired manner but insulated therefrom but electrically connected with the ends of the wire of solenoid 2 so that current may be passed through the solenoid.

In connection with the action of members 4 and 5, it will be noted that when polarized light is sent through certain transparent material and this material is at the same time subjected to action of magnetism, the plane of polarization of the light is rotated and when seen by the eye looking through the substance appears light or dark, the degree of rotation being constant for the same sort of light, the same sort of material, and the same strength of magnetism. If the currents setting up the magnetism are varied, variations in the plane of rotation mentioned will indicate a change of current and will indicate a greater or less amount of current according to the degree of rotation. In the structure heretofore described, when a current of electricity is passed through the solenoid, the plane of polarization of the light is rotated, different strengths of current rotating the light to different degrees. These various rotations are indicated in amperes on the face plate 7 so that the current may be read directly in amperes on the face plate 7. In operation the analyzer 5 is set for extinction of light, and when set in this position the pointer 10 indicates zero on the scale 11. Current of unknown strength is then passed through the coil 2 and this rotates the plane of polarization of the light so that light will be transmitted through the glass core 8 and may be seen through the opening 12. The face plate 7 is then rotated, which will also rotate the analyzer 5. This rotation is continued until the light has been extinguished. If plate 7 is rotated until the numeral 10 on the scale 11 is below the pointer 10, it will indicate that ten amperes are passing through the coil. If the current strength is increased or decreased the plane of polarization is correspondingly varied; in order to read the changed current plate 7 is rotated until the light has been extinguished and then the amperage is read directly on the scale 11.

Having thus described my invention I claim as new and desire to secure by Letters Patent:—

1. An electric measuring device, comprising a casing, a solenoid in the casing and having a hollow core terminating short of one end thereof, a polarizing prism in the end of the core extending to the end of the solenoid, a transparent body in the core of the solenoid, an apertured and graduated plate mounted to turn on one end of the casing and having a tubular extension extending into the solenoid in line with the core thereof, an analyzing prism in the tubular extension, and a pointer secured to the casing and extending above the graduated plate.

2. An electric measuring device comprising a casing, a solenoid in the casing and having a hollow core, a polarizing prism in one end of the core, a graduated and apertured plate mounted to turn on the casing, a transparent body in the core of the solenoid, an analyzing prism carried by the plate within the solenoid, and a pointer secured to the casing and extending above the graduated plate.

3. In an electric measuring device, a light polarizing prism, a light analyzer arranged in line with said prism, a single solenoid having a hollow core in which the said prism and said analyzer are mounted, a rotatable plate connected with said analyzer and adapted to rotate said analyzer, said plate being formed with an opening for viewing the analyzer, and a stationary pointer projecting over part of said plate for indicating the amount of rotation of the plate.

4. In an electric measuring instrument, a polarizing prism, an analyzer arranged opposite said polarizing prism, a transparent core member separating said polarizing prism and said analyzer, a solenoid having a hollow core in which the analyzer, transparent member, and the prisms are mounted, said solenoid being adapted to have current passed therethrough whereby the plane of polarization of the light passing through said polarizing prism will be rotated, a rotatable plate for supporting said analyzer and adapted to rotate the analyzer when rotated, and a fixed or stationary indicator arranged adjacent said plate for indicating the amount of movement necessary to be made by said plate to extinguish the light passing through said analyzer after the light has been rotated whereby the current strength will be indicated.

In testimony whereof I have signed my name to this specification in the presence of two subscribing witnesses.

LLOYD LOGAN.

Witnesses:
  EBEN GEORGE GOULD,
  ALBERT HARRY SCHEIBEL.